March 4, 1924. 1,485,522
K. PARK
DEMOUNTABLE RIM JACK
Filed May 27, 1922  2 Sheets-Sheet 1
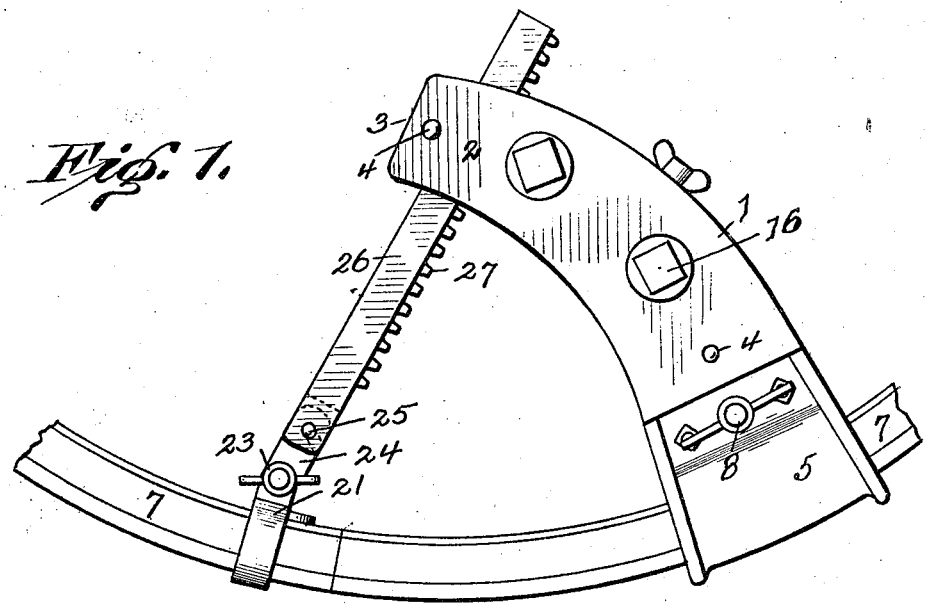
Fig. 1.
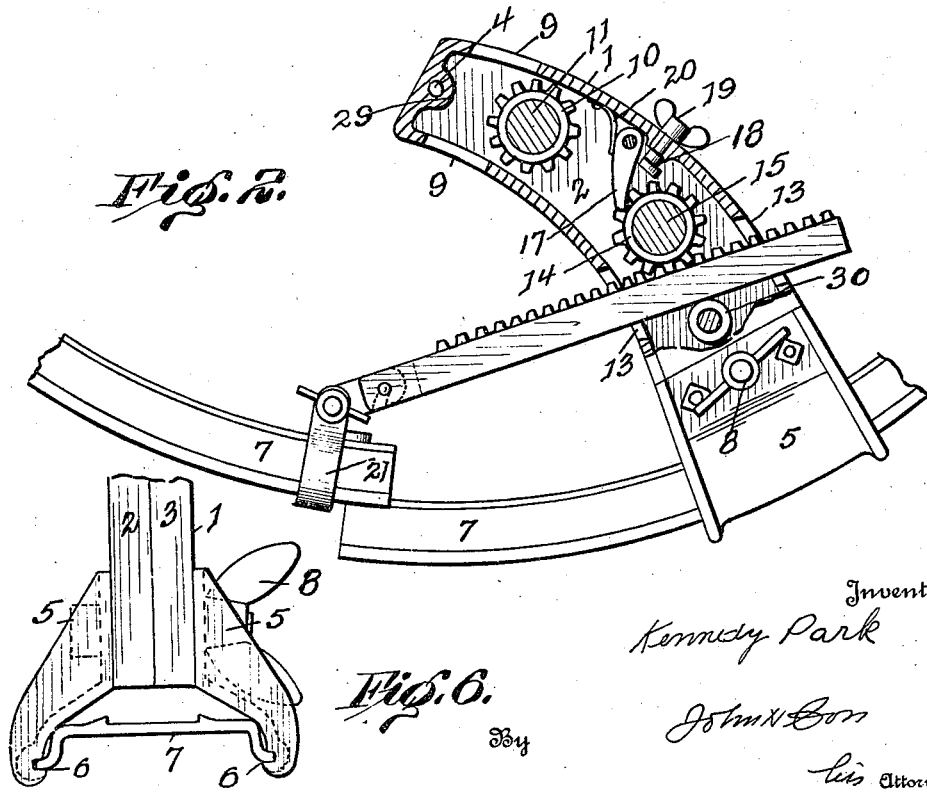
Fig. 2.
Fig. 6.
Inventor
Kennedy Park
By John N Bon
his Attorney March 4, 1924. 1,485,522
K. PARK
DEMOUNTABLE RIM JACK
Filed May 27, 1922  2 Sheets-Sheet 2

Inventor
Kennedy Park

By John N. Gos
his Attorney

Patented Mar. 4, 1924.

1,485,522

UNITED STATES PATENT OFFICE.

KENNEDY PARK, OF MANSFIELD, OHIO.

DEMOUNTABLE-RIM JACK.

Application filed May 27, 1922. Serial No. 564,031.

*To all whom it may concern:*

Be it known that KENNEDY PARK, citizen of the United States of America, residing at Mansfield, in the county of Richland and State of Ohio, has invented certain new and useful Improvements in Demountable-Rim Jacks, of which the following is a specification.

This invention is directed to a demountable-rim jack, in the use of which the ends of the usual split rim may be readily separated, drawn to an extreme collapsed relation, and held in such position at will, thereby permitting the ready and convenient removal or application of the tire.

The collapsing of the usual split rim to permit removal of the tire, or the spreading of the rim after the tire has been applied, is ordinarily a difficult undertaking, particularly if the rim has been in use, and where the ordinary tools only are available to assist in the work, the labor and skill required are considerable. The jack of the present invention is designed to permit the operation of splitting the rim, collapsing the same, and replacing or expanding the rim, to be readily and conveniently performed by anyone and under any road conditions, without fatigue, and without requiring any particular skill or experience.

The jack involves a main bracket adapted to be removably secured to the rim immediately adjacent the split or division thereof. A cooperating part is removably secured to the rim on the opposite side of the division. A bar is movably connected to the cooperating part and passed through one or the other of two openings in the bracket. In either position of the bar, teeth formed thereon are engaged by a pinion mounted in the bracket, with the pinion adapted for rotation through the use of an ordinary wrench. The bar is thus drawn upon, with the result that the rim ends separate.

An important object of the present invention is the arrangement of the bracket-openings for the reception of the bar, so that the pull on the bar may in one instance be substantially radial of the rim, thus initially separating the rims ends along the line of least resistance. The cooperation of the bar with the remaining pinion of the bracket positions the bar so that the pull thereon is substantially tangential of the rim, thus collapsing the rim along the line of least resistance. The bar is adapted to be secured in any desired position in its tangential pull, to thereby hold the rim collapsed until the tire has been removed and a new tire applied; whereupon the bar may be forced in a reverse direction to replace the rim ends in normal positions.

The invention is illustrated in the accompanying drawings, in which:—

Fig. 1 is a view in elevation of the rim jack, showing the same applied to a rim, and the bar in position to exert the initial or radial pull.

Fig. 2 is a similar view, with the main bracket in section, the bar being in a position to exert the secondary or tangential pull.

Fig. 6 is a detail in elevation, showing the connection of the main bracket to the rim.

Figure 3:
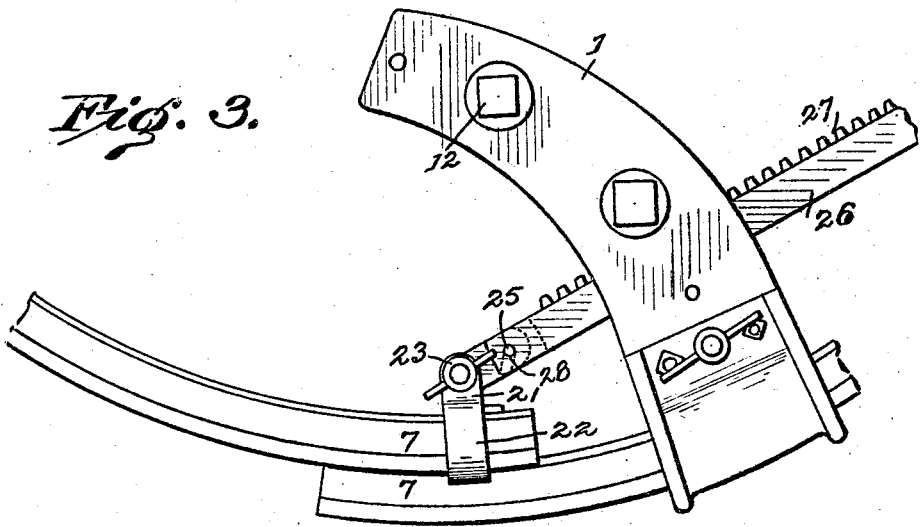
Fig. 3 is a similar view, with the parts in the positions occupied following the collapse of the rim.

The improved jack comprises a main bracket 1, made up of similar hollow sections 2 and 3, adapted to be secured together, as by bolts 4, to provide a hollow bracket closed at the ends and sides. The bracket as a whole is curved longitudinally, as shown, and this curved formation tends to an important result, as will later appear.

The lower, and preferably larger end of the main bracket is provided with removable jaws 5, appropriately curved away from the bracket below the same, and formed on their inner surfaces with recesses 6 to receive the edges of the rim 7. Through appropriate means, such as a thumb nut 8, fitting the bolts for removably supporting the jaws on the bracket, the main bracket may be rigidly secured to the rim being operated upon, preferably immediately adjacent the end or division of such rim.

The side walls of the bracket are formed near the free end with openings 9, and within the bracket and in appropriate relation to these openings, there is mounted a pinion 10, the shaft 11 of which extends through the wall of the bracket and is squared, as at 12, to permit the application of a wrench. The longitudinal curvature of the main bracket is such that when applied the openings 9 are in substantial radial alinement with the division of the rim, as will be plain from the drawings. The main bracket side walls are further formed below the openings 9, with other and similar openings 13, a second pinion 14, being mounted within the bracket in proper relation to the openings 13, with its shaft 15 extended beyond the bracket wall and squared at 16 for wrench application. A locking pawl 17 is mounted within the bracket to engage and lock the pinion 14 at will, a cam lug 18, operative from beyond the bracket, as at 19, being adapted to hold the pawl in inoperative position against the spring 20, at will.

A bar-bracket 21 is adapted to be engaged with the rim on the opposite side of the rim division, this bracket including jaws 22, formed to interfit with the rim edges and secured by clamping means 23. A bar 26, formed on one edge with teeth 27 of a size to cooperate with the teeth of the pinions 10 and 14, is bifurcated at one end, and provided with a pin 25, bridging the bifurcation. A link 24 is pivotally arranged between the inwardly-projecting ends of the jaws 22, and is formed with a slot opening through one edge of the link, to permit removable engagement of the link with the pin 25. The connection between the bar and link permits the bar to be readily disconnected from the link at will, and provides for a limited pivotal movement between the bar and link.

The bar is adapted to be passed through the openings 9 in the main bracket and engaged with the pinion 10, in the initial separating movement of the rim ends. In this position the bar is held in engagement with the pinion by an offset 29 formed in the main bracket. On rotation of the pinion 10, as by a wrench or the like, the bar is drawn upon and the end of the rim to which the bar is connected is drawn substantially radial of the rim. This of course is the line of least resistance, and permits the desired separation without extreme effort or without liability of damaging the meeting and usually interlocking edges of the rim. After the rim ends are separated, the natural resiliency of the rim displaces these edges, so that one rests over the other, as in Fig. 2. The bar is then disconnected from the link 24, withdrawn from the openings 9, inserted in the openings 13, and engaged with the pinion 14, a roller 30 maintaining the engagement. The bar is then connected with the link 24, and the pinion 14 operated. In this movement of the bar the line of pull is substantially tangential of the rim, thus drawing the overlapped end along the line of least resistance, until the rim has been collapsed to the desired extent. The pawl 17 is then permitted to move to pinion locking position, and the rim is held in collapsed relation until the work in hand, such as removing a tire and replacing a new tire, has been accomplished.

Figure 4:
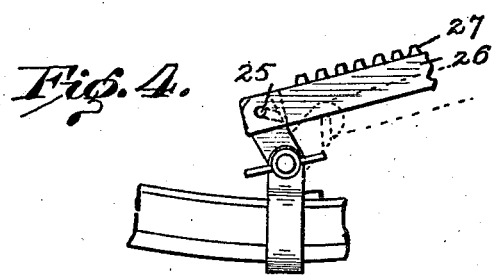
Fig. 4 is a detail showing the position of the bar in operating the same to expand the rim.
Figure 5:
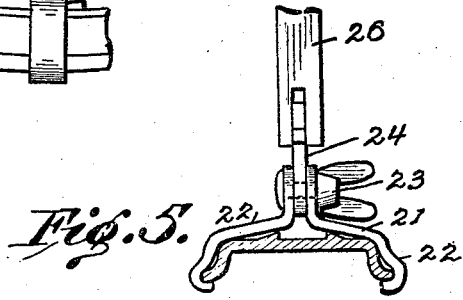
Fig. 5 is a broken elevation of the bar-bracket and bar, with the rim in section, showing particularly the connection between the bar and bracket.
Figure 7:
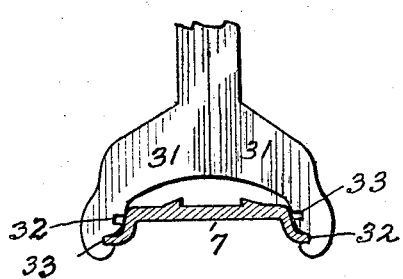
Fig. 7 is a modified form of main bracket.

The pawl may be released, and the pinion 14 operated in a reverse direction when desired, to force the ends of the rim toward each other until the proper meeting is accomplished. In the expanding operation, the link turns on its pivot, so that the operation is a pull on the rim end rather than a push. (See full line in Fig. 4.) If preferred, the operation can be in the nature of a push on the rim as shown in dotted line in Fig. 4.

It will of course be understood that in breaking the rim, the radial separation of the parts will offset the meeting ends so as to permit the strain of the applied tire to cause said ends to overlap, as indicated in Fig. 2, thus permitting the change in position of the rod 26 for the tangential pull. In expanding the rim, the endwise pressure on the inner lapped rim end is continued until the meeting ends are in alignment or slightly beyond such alignment, when the spreading tendency or tendency to assume a circular form, will cause such offset end to move out into proper rim forming position.

While preferring that the main bracket be provided with removable clamping jaws as described, it is also contemplated to form the bracket in separable halves, with the ends formed with the desired spread to embrace recesses 32 and 33 for co-operating with rims of different sizes. Otherwise this modified form of bracket will be constructed as in the preferred form.

Attention is called to the fact that the rack bar is held in mesh with the teeth of the pinions, which are inserted in this opening by a roller 30, or its equivalent, an offset 29, thereby permitting the rack bar to slide and pivot when moved, relieving any under strain upon the parts.

Having thus described the invention, what is claimed as new, is:—

1. A rim jack including a curved main bracket adapted to be removably secured to a rim adjacent the line of division, a bar adpated to be removably secured to the rim on the opposite side of the line of rim division, and a plurality of means carried by said bracket for operating the bar, said bar being adapted for cooperation with either of said means at will to thereby operate the bar in respectively different lines with regard to the rim.

2. A rim jack having a main bracket, a bar, and independent bar operating means arranged in said bracket and operable from beyond the bracket, said bar being capable of arrangement for cooperating with either of said means at will.

3. A rim jack comprising a main bracket to be secured to a rim, a bar to be secured to the rim, and spaced pinions arranged in said main bracket to receive and operate said bar, said bar being adapted to cooperate with either of said pinions at will, each of said pinions compelling the movement of the bar along a different line with respect to the rim.

4. A rim jack comprising a main bracket adapted to be secured to the rim, a bar adapted to be secured to the rim, means in the bracket to operate the bar radially of the rim, and independent means in the bracket to operate the said bar tangentially of the rim.

5. A rim jack comprising a bracket, spaced pinions arranged in the bracket and operable from beyond the same, means for locking one of said pinions against movement in one direction, and a bar adapted to cooperate with and be operated by either pinion at will.

6. A rim jack comprising a curved bracket, clamping jaws at one end of said bracket, spaced sets of openings in the walls of said bracket, spaced pinions arranged in relation to said openings, a toothed bar adapted to be passed through either set of openings and cooperate with and be operated by either pinion, and means to secure the bar to the rim.

7. A rim jack having a curved main bracket, a toothed bar, spaced pinions mounted in the bracket and arranged to be selectively engaged by the teeth of said bar, rim engaging means carried by the main bracket, and rim engaging means carried by said bar.

8. In a device for removing tires, a bracket provided with means for clamping same to the rim, said bracket also having openings provided therein, a rack bar adapted to slidably fit and pivot within either of said openings, pinions adapted to mesh with said rack bar and means detachably clamped to the rim and rack bar, whereby when movement is imparted to the rack bar the rim ends will be forced to separate from each other and collapsed to a smaller diameter upon further movement.

9. In a device for removing a tire from a rim, a bracket having openings therein, pinions mounted thereon in spaced apart relation, a rack bar adapted to be slidably and movably mounted on the bracket in either of said openings in the bracket and means to connect the rack bar to the rim in different angular relations to provide for tangential and direct pull thereon, as described and set forth.

10. In a tire remover, a bracket provided with openings, removable means adapted to slide and pivot in either of said openings, means adapted to impart movement to said removable means, means for connecting the removable means to the rim when inserted in either of said openings, whereby when movement is imparted to the removable sliding means, in one direction, the rim ends will be forced to separate upon further movement, and in the other direction, collapsed and by the reverse movement of said movable means be forced to expand.

11. A rim jack comprising a curved bracket, means to secure the bracket to a rim to maintain a portion of the bracket radial to the rim and a portion thereof substantially parallel with the rim, a bar-operating means in each of said bracket portions, and a bar to cooperate with either of said operating means at will to thereby change the direction of movement of the bar with respect to the rim, and means to secure the bar to the rim.

12. A rim jack comprising a bracket, means to secure the bracket to a rim, a bar adapted to be secured to the rim, independent bar-operating means carried by the bracket with either of which the bar may cooperate, and bar directing means carried by the bracket to compel the bar when in cooperation with one operating means to move substantially radially of the rim and in cooperation with the other operating means to move substantially tangential of the rim.

In testimony whereof I affix my signature.

KENNEDY PARK.